United States Patent [19]

Oney

[11] Patent Number: 5,777,840
[45] Date of Patent: Jul. 7, 1998

[54] NON POLAR TANTALUM CAPACITOR

[75] Inventor: Thomas A. Oney, Greencastle, Ind.

[73] Assignee: Yosemite Investment, Inc., Indianapolis, Ind.

[21] Appl. No.: 740,500

[22] Filed: Oct. 29, 1996

[51] Int. Cl.⁶ ................................................ B65D 51/00
[52] U.S. Cl. .......................... 361/519; 361/535; 361/537; 29/25.03
[58] Field of Search .......................... 361/503, 508, 361/509, 512, 513, 517, 518, 519, 520, 529, 535, 536, 537, 539; 29/25.03, 25.42

[56] References Cited

U.S. PATENT DOCUMENTS

| | | | |
|---|---|---|---|
| 3,120,695 | 2/1964 | Burnham | 29/25.03 |
| 3,297,918 | 1/1967 | Booe | 361/518 |
| 3,508,122 | 4/1970 | Baker | 361/503 |
| 5,105,341 | 4/1992 | Stephenson et al. | 361/518 |

*Primary Examiner*—Kristine L. Kincaid
*Assistant Examiner*—Anthony Dinkins

[57] ABSTRACT

An all tantalum electrolytic capacitor is rendered non-polar by properly anodizing the tantalum electrodes. That is, the anodization process is controlled such that both electrodes have substantially the same amount of capacitance which preferably is twice the capacitance on the rated capacitance of the capacitor. The anodization voltage is at least greater than the rated voltage of the capacitor.

4 Claims, 1 Drawing Sheet

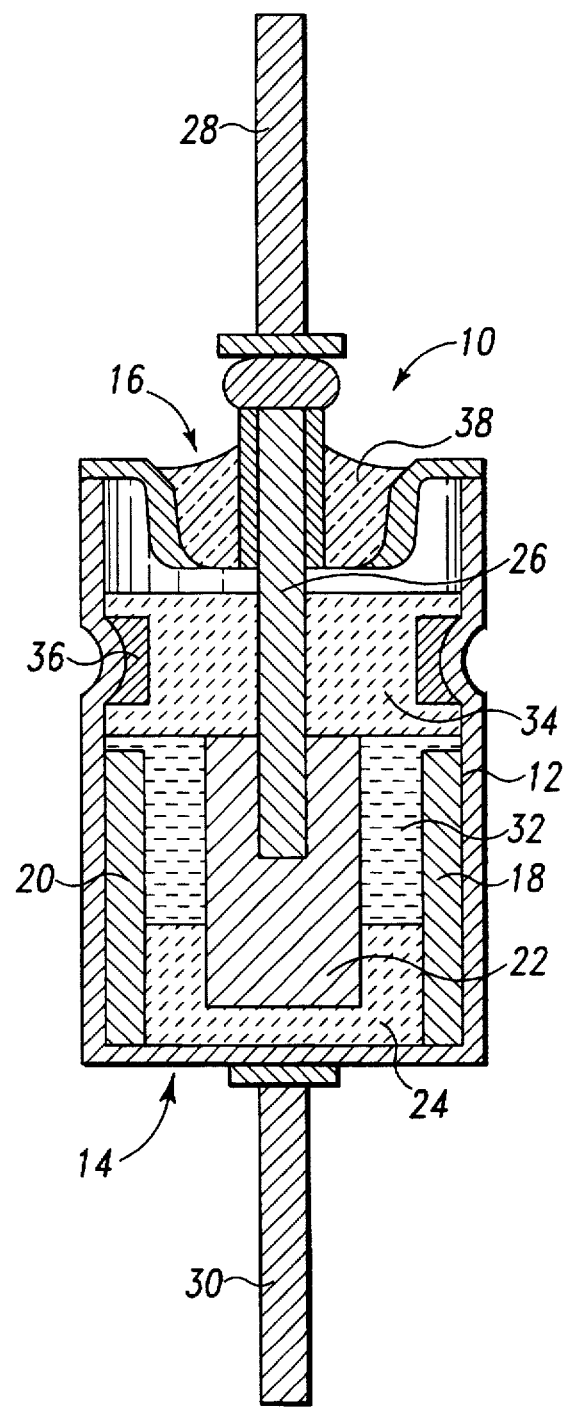

NON POLAR TANTALUM CAPACITOR

BACKGROUND OF THE INVENTION

The present invention relates to tantalum electrolytic capacitors and more particularly to such capacitors that are non polar. The present capacitor may be made at its rated voltage in either direction for A C application or in DC circuits where greater voltage reversals occur than polarized can tolerate. For example inter communication systems on commercial aircraft require the use of such capacitors.

SUMMARY OF THE INVENTION

According to the present invention there is provided a capacitor having a tantalum outer case with a bottom and an open end, a capacitor body carried within the case and electronically connected thereto, an electrode including a tantalum shell carried within and against an inner wall of the case, an electrode including a tantalum slug carried within and electrically isolated from the tantalum shell, a liquid electrolyte disposed between the tantalum shell and the tantalum slug; closing means closing the open end; and electrical terminals electrically connecting the tantalum outer case and the tantalum slug; the electrode tantalum shell and the tantalum slug being anodized to substantially the same capacitance to effect a non-polar capacitor.

In order to aid in extending the life of the capacitor, the anodized voltage of the tantalum shell and slug is greater than the rated voltage of the capacitor.

To aid in insuring the non polar characteristic of the capacitor, such anodized capacitance should be at least about twice the rated capacitance of the capacitor.

DESCRIPTION OF THE DRAWINGS

The sole figure is a cross section schematically showing a capacitor employing the invention.

DETAILED DESCRIPTION OF THE INVENTION

Referring now to the drawings there is shown a capacitor 10 employing the features of the invention. Capacitor 10 includes an outer cup shaped tantalum case 12 having a bottom end 14 and an open end 16. A tantalum electrode shell 18 is carried within and against an inner wall 20 of the case. A tantalum electrode slug 22 is carried within the shell through a Teflon support cup 24. A lead wire 26 that is preferably fabricated of tantalum extends from tantalum electrode slug 22 and is connected to lead wire 28. Another lead wire 30 extends from case 14. Disposed between electrode tantalum slug 22 and tantalum electrode shell 18 is an electrolyte 32. A 38% sulfuric acid based electrolyte would be suitable. A Teflon gasket 34 in conjunction with sealing ring 36 and a suitable glass to metal seal 38 seals open end 16.

In accordance with the present invention the capacitor is rendered non-polar by anodizing the tantalum electrode shell 18 and the electrode slug 22 to the same desired capacitance. The tantalum shell 18 and the tantalum slug 22 along with tantalum lead wire 26 are formed from a suitable powder using a suitable binder and pressed and sintered. The tantalum shell 18 and the tantalum slug 22 are then anodized to a required anodized voltage to form a pentoxide film thereon. The pentoxide film serves as the capacitor dielectric.

The term anodized voltage is meant to mean the voltage that is applied to the tantalum shell and slug when forming the pentoxide film. In order to provide for the non polar characteristic of the capacitor, the capacitance should be substantially the same for the tantalum shell and slug subsequent to being anodized. And to aid in insuring the non-polar characteristics, such anodized capacitance should be at least about twice the rated capacitance of the capacitor.

In order to provide for an extended capacitor life, the anodized voltage of the tantalum shell and tantalum should be at least greater than the rated voltage of the capacitor.

At least that portion of the tantalum lead wire imbedded in the tantalum slug also meets such anodized criteria.

What is claimed is:

1. A capacitor having a tantalum outer case with a bottom and an open end, an electrode including a tantalum shell carried within and against an inner wall of the case, an additional electrode including a tantalum slug carried within and electrically isolated from the tantalum shell, a liquid electrolyte disposed between the tantalum shell and tantalum slug, closing means closing the open end, and electrical terminals electrically connecting the tantalum outer case and the tantalum slug, the electrode tantalum shell and the tantalum slug anodized to substantially the same capacitance to effect a non-polar capacitor and wherein such capacitance is at least twice a rated capacitance of the capacitor.

2. A capacitor according to claim 1 wherein an anodized voltage of the tantalum shell and slug is greater than a rated voltage of the capacitor.

3. A capacitor according to claim 1 wherein a tantalum lead wire is connected to the tantalum slug at least a portion of the tantalum lead wire embedded in the tantalum slug has an anodized capacitance of at least twice the rated capacitance of the capacitor.

4. A capacitor according to claim 3 wherein the portion of the lead wire embedded in the tantalum slug has an anodized voltage greater than a rated voltage of the capacitor.

* * * * *